United States Patent [19]

Gunter

[11] Patent Number: 5,779,163
[45] Date of Patent: Jul. 14, 1998

[54] CENTER PIVOT IRRIGATON SYSTEM DROP STABILIZER

[76] Inventor: Uil L. Gunter, HCR 2 Box 27, Olton, Tex. 79064

[21] Appl. No.: 546,951

[22] Filed: Oct. 23, 1995

[51] Int. Cl.[6] .................................................. B05B 7/18
[52] U.S. Cl. ............................... 239/734; 239/728
[58] Field of Search ........................ 239/722, 723, 239/726, 728, 730, 732, 734

[56] References Cited

U.S. PATENT DOCUMENTS

| | | | |
|---|---|---|---|
| 1,197,534 | 9/1916 | Norton . | |
| 2,893,643 | 7/1959 | Gordon | 239/177 |
| 2,941,727 | 6/1960 | Zybach | 239/177 |
| 3,353,751 | 11/1967 | Dowd | 239/177 |
| 3,445,066 | 5/1969 | Mohar | 239/189 |
| 3,648,930 | 3/1972 | Brown et al. | 239/156 |
| 3,653,400 | 4/1972 | Coates | 137/344 |
| 3,669,355 | 6/1972 | Jurgens | 239/177 |
| 3,870,235 | 3/1975 | Newell | 239/177 |
| 4,397,421 | 8/1983 | Schram | 239/177 R |
| 4,763,836 | 8/1988 | Lyle et al. | 239/69 |

*Primary Examiner*—Lesley D. Morris
*Attorney, Agent, or Firm*—Jacobson, Price, Holman & Stern, PLLC

[57] ABSTRACT

A center pivot irrigation system is provided with longitudinally spaced drop tubes including flexible lower end portions for dragging upon the ground and an elongated low height tension member is tensioned between adjacent towers with structure by which the lower end portions of the drops may be clamped to the tension member.

15 Claims, 3 Drawing Sheets

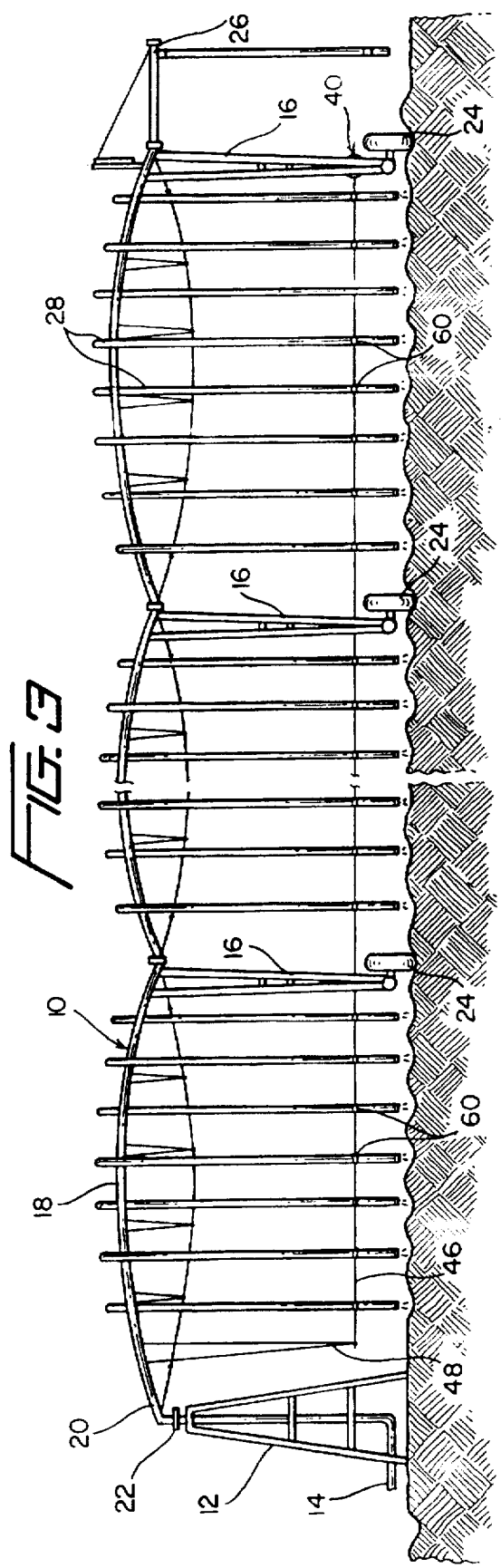
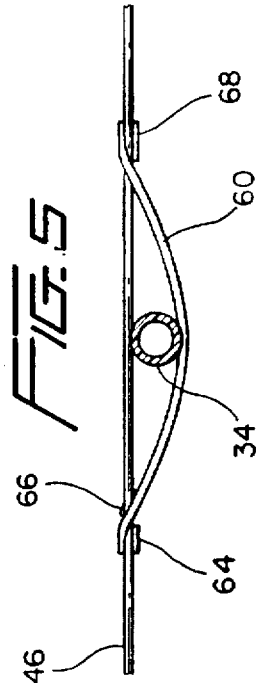
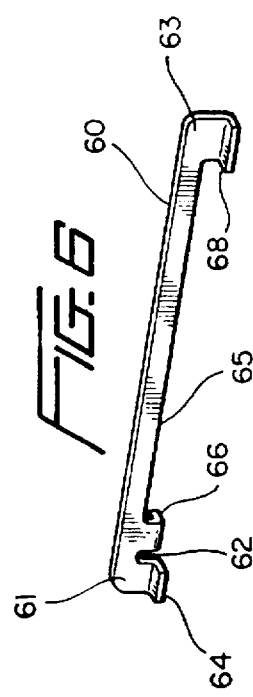
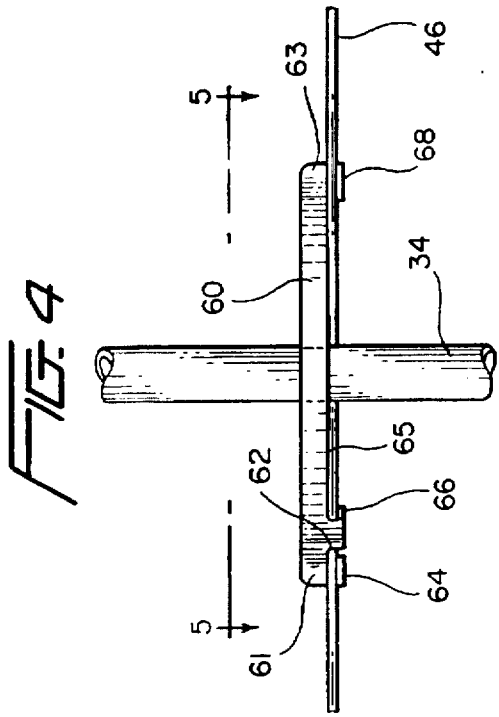

5,779,163

1

CENTER PIVOT IRRIGATON SYSTEM DROP STABILIZER

BACKGROUND OF THE INVENTION

1. Field of the Invention

An elongated, horizontal adjustable height stabilizer extends between adjacent towers of a center pivot irrigation system and releasable anchor structure is utilized releasably anchor the lower end portions of drop tubes of the irrigation system to the stabilizer. When a pair of laterally spaced stabilizers are provided the latter also serve to protect the center drive motor at each tower from being by livestock.

2. Description of Related Art

Various different forms of travelling irrigation systems including center pivot irrigation systems heretofore have been provided and many of these previously known systems include general structural features of a typical center pivot irrigation system with which the instant invention has been designed to be used.

Examples of these previously known irrigation systems are disclosed in U.S. Pat. Nos. 1,197,534, 2,893,643, 2,941, 727, 3,353,751, 3,653,400, 3,445,066, 3,669,355, 3,870,235, 4,397,421 and 4,763,836. However, these previously known devices are not specifically designed to accomplish "low energy precision application" of irrigation water and further do not incorporate flexible hoses or "drops" which extend downward from the main line of the system to a low level spray body or emitter at or near ground level and, accordingly, do not encounter difficulty in precision application of irrigation water because of lateral deflection of the "drops" due to windy conditions, or irregularities in crop row placement.

SUMMARY OF THE INVENTION

The stabilizer of the instant invention has been specifically designed to be used in conjunction with center pivot irrigation systems in use to irrigate concentric circular crop rows made in confirmation with the center pivot irrigation pattern.

Center pivot irrigation systems of this type include long depending flexible hoses or "drops" which depend downward from the main line or delivery pipe of the system extending between adjacent support towers of the system and the drops terminate downwardly in removable flexible tubes or hoses whose lower ends drag upon the ground in the furrows between adjacent rows of crops.

This type of center pivot irrigation system requires considerably less power to drive the pump thereof, inasmuch as high water pressure is not required for a multitude of sprinkler heads, and the water discharged from the lower ends of the "drops" is deposited directly upon the ground in the furrows between adjacent rows of crop. This of course eliminates the loss of all of the water discharged from a spray head which normally evaporates before reaching the ground and further eliminates approximately one half of water loss due to evaporation of water from damp ground surfaces, the only ground surfaces being dampened by water being discharged from the "drops" being the ground surfaces in the furrows between adjacent rows.

Because of the substantially reduced power requirement, the prevention of evaporation of airborne water and the prevention of evaporation of water from crop foliage and the ground in the crop rows, irrigation of a given acreage is carried more effectively and at a lower cost.

In addition, the "drops" are spaced forward of the leading side of the irrigation system as well as rearward of the

2 trailing side of the irrigation system and the stabilizer incorporates tensioned stabilizer wires or the like which are laterally spaced apart to the leading and trailing sides of the irrigation system. The lower end portions of the drops are anchored to the stabilizer wires for stabilizing purposes. These stabilizing wires are anchored to adjacent towers of the irrigation system on opposite sides of the drive motors for the towers and therefore further serve to prevent livestock from "rubbing" the drive motors of the support towers.

The main object of this invention is to provide a stabilizing system for the "drops" of a "low energy precision application" type center pivot sprinkler system.

Another object of this invention is to provide a stabilizer system which will also function as a barrier to prevent livestock from "rubbing" the drive motor assembly of the wheeled support towers of the irrigation system.

Still another object of this invention is to provide a stabilizer system which may be readily mounted upon an existing center pivot irrigation system.

Another important object of this invention is to provide a "drop" stabilizer system in accordance with the preceding objects and which may be readily adjusted in height so as to adapt the system for irrigating newly germinated crops as well as various crops at different intervals during their growing cycle.

A final object of this invention to be specifically enumerated herein is to provide a stabilizer system in accordance with the preceding objects and which will conform to conventional forms of manufacture, be of simple construction and easy to use so as to provide an apparatus that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary, schematic side elevational view of the center pivot irrigation system illustrated in FIG. 1;

FIG. 4 is a fragmentary enlarged side elevational view illustrating the manner in which a spring-type strip is utilized to removably anchor an individual drop tube to one of the stabilizing wires of the stabilizing system;

FIG. 5 is a horizontal sectional view taken substantially upon the plane indicated by the section line 5—5 of FIG. 4;

FIG. 6 is a perspective view of the spring-type anchoring s trip illustrated in FIGS. 4 and 5.

DETAILED DESCRIPTION OF THE INVENTION

Figure 1:
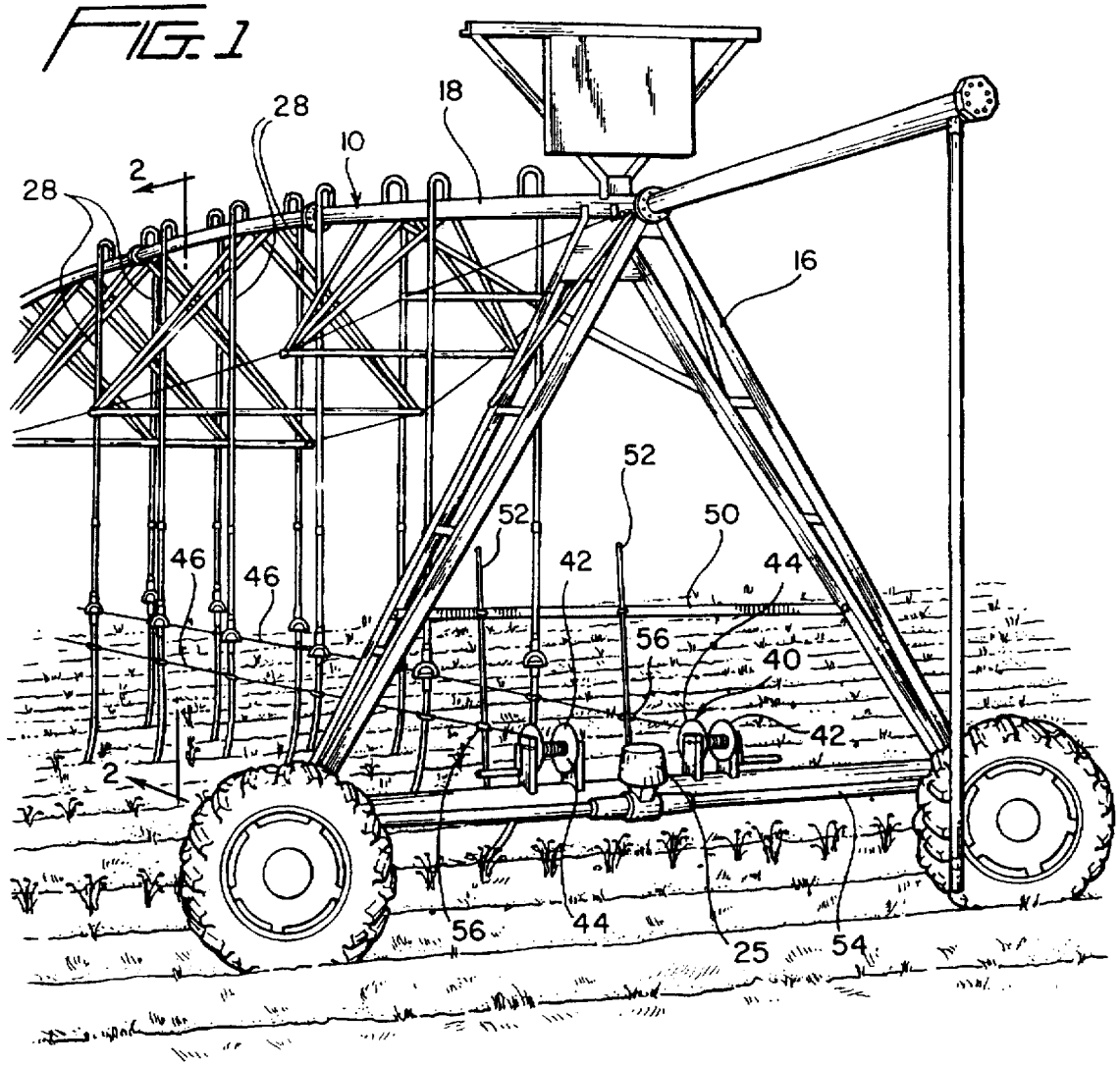
FIG. 1 is a fragmentary perspective view of the radially outermost end of a typical center pivot irrigation system with which the drop tube stabilizer assembly of the instant invention has been operatively associated.

Referring now more specifically to the drawings the numeral 10 generally designates a center pivot irrigation system including a center stationary tower 12 to which water is supplied through a supply pipe 14 from an adjacent well (not shown). The system 10 incorporates a plurality of wheeled support towers 16 supporting longitudinally spaced portions of an elevated delivery pipe 18 including an inlet end 20 coupled to the supply pipe 14 through a rotary coupling 22.

Figure 7:
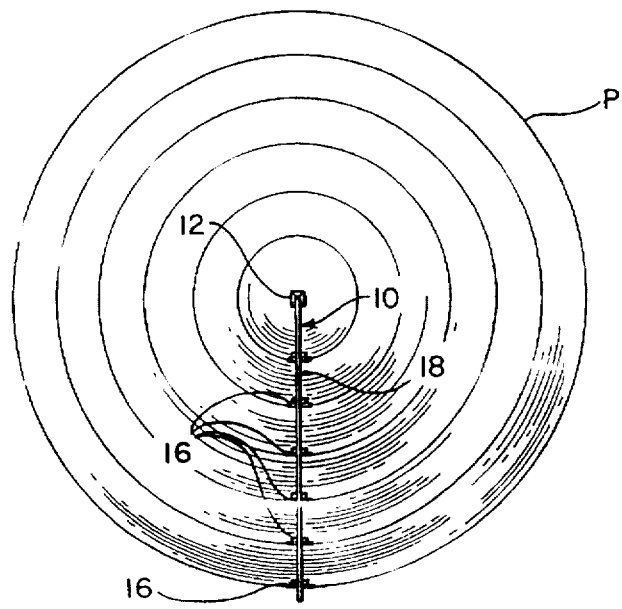
FIG. 7 is a top plane view of a farm field with which a center pivot irrigation system is in use and illustrating the manner in which the crop rows are formed in concentric circles conforming to the circular pattern of the irrigation system.
Figure 2:
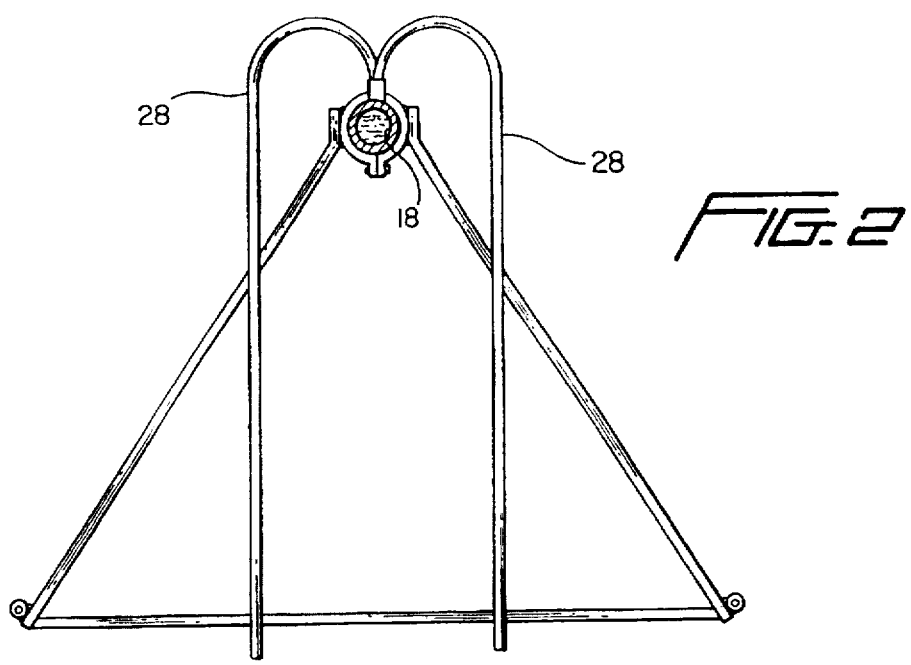
FIG. 2 is an enlarged fragmentary vertical sectional view taken substantially upon the plane indicated by the section line 2—2 of FIG. 1.
Figure 2A:
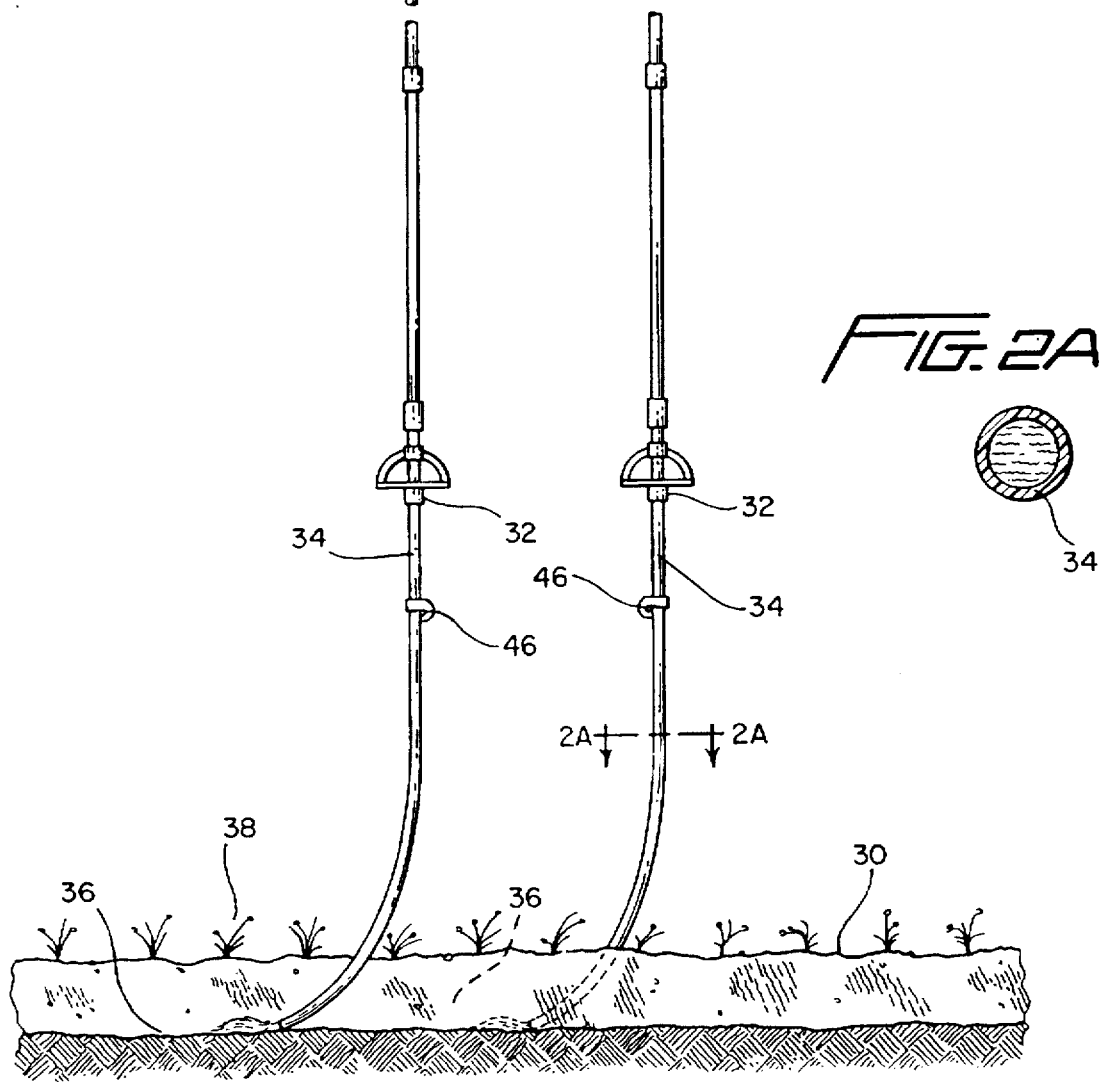
FIG. 2A is a further enlarged horizontal sectional view taken substantially upon the plane indicated by the section line 2A—2A of FIG. 2.

The support wheels 24 of the towers 16 are driven by motors 25 which may be either water powered or electrically powered and the system 10 includes controls (not shown) for these motors that maintain the towers 16 aligned along a radius of a circular pattern P having the tower 12 at its center, see FIG. 7.

The end of the delivery pipe 18 remote from the tower 12 includes a dump valve assembly 26 which may be manually or automatically opened at timed intervals in order to flush the delivery pipe of accumulated sand and other foreign materials collecting therein from the aforementioned well.

Conventionally, drop pipes or tubes 28 open outwardly of the delivery pipe 18 at points spaced longitudinally therealong and depend downwardly toward the agricultural field 30 over which the towers move. The drop pipes or tubes 28 open outwardly of the delivery pipe 18 at the upper periphery thereof to reduce the possibility of sand within the delivery pipe 18 passing upwardly into the drop pipes or tubes 28 and the tubes 28 extend downwardly to midheight couplers 32 from which spray heads may be mounted. However, in the instant situation, the spray heads have been eliminated and the drop pipes or tubes 28 have been provided with flexible lower end portions 34 which extend down to and contact the ground comprising the agricultural field 30 in a manner such that the lower terminal ends of the lower end portions 34 are deflected rearwardly in relation to the direction of movement of the delivery pipe or tube 18 and track in the circular furrows defined between adjacent rows of the crop 38 being grown in the field 30.

By utilizing the drop pipes or tubes 28 and the downwardly extending lower end portions 34 thereof, the water discharged from the delivery pipe 18 into the drop pipes or tubes 28 is deposited directly upon the ground in the furrows 36 between adjacent rows of the crop 38. By this procedure, as opposed to mounting high pressure sprinkler heads at the couplers 32, all airborne evaporation of water is eliminated and only the furrows 36 of the field 30 are wetted. This of course also eliminates evaporation of water from soil along the crop rows and from the foliage of the crop 38 itself, substantially all of the water being used for irrigation purposes being allowed to soak downwardly into the ground to the roots of the crop 38.

This type of "low energy precision application" of water during an irrigation process requires less power (lower water pressure in the delivery pipe 18) and constitutes a considerable savings in water, which savings in water is particularly important during extended dry seasons when the water table might otherwise drop sufficiently to cause insufficient water to be available at the aforementioned well.

However, in agricultural areas in which high winds sometimes occur, such high winds may blow the lower ends of the drop pipes or tubes 28 as well as the lower end portions 34 sufficiently to deflect the latter out of position in relation to the furrows 36, which furrows 36 are initially formed throughout the pattern P in accordance with the spacing of the drop pipes or tubes 28 along the delivery pipe 18.

The foregoing may be considered as conventional structure presently in use at least in the southwest of the United States, in which area sustained winds of appreciable velocities as well as wind gusts of higher velocities occur.

When appreciable wind velocities occur in a direction which generally parallels the line of towers 16, the drop tubes 28 and especially the lower end portions 34 thereof may be blown from one furrow 36 into an adjacent furrow or even the second adjacent furrow with the result that some furrows 36 may receive three times the desired amount of water while the furrows from which a pair of lower end portions 34 have been blown receive no water. Although, in this instance, the center pivot irrigation system still functions in a manner to prevent excess evaporation of water discharged thereby, some furrows do not receive sufficient water and the crops in the adjacent rows suffer for lack of water.

In order to assure that the lower end port ions 34 will remain in the proper furrows 36, the stabilizer system of the instant invention has been designed.

The stabilizer system is referred to in general by the reference numeral 40 and incorporates a pair of hand actuated winch assemblies 42 on at least the radial outermost tower 16. Each winch assembly 42 includes a winding spool 44 to which one end of an elongated flexible tension member such as a length of wire 46 is anchored and the other end of each wire 46 is either anchored to the next inward tower 16 or to a depending support 48 (see FIG. 3) immediately adjacent the tower 12. In addition, at least the radial outermost tower 16 and support 48 each include a horizontal brace 50 and a pair of uprights 52 having their upper end portions anchored to the brace 50 and their lower end portions anchored to the lower horizontal member 54 of the radial outermost tower 16. The uprights 52 each include a clamp member 56 releasably mounted in adjusted height thereon and to which the corresponding tension member 46 is anchored.

If the tension members 46 are to extend only between adjacent towers 16 the end s of the tension members 46 remote from the spools or winding members 44 will be anchored to the uprights 52 on the next inward tower 16. On the other hand, if the tension members 46 are to extend between the outermost tower 16 and the brace 48, the brace 48 also will be provided with upright corresponding to the uprights 52 and clamps 56 mounted thereon to which the free ends of the tension members 46 may be anchored. However, intermediate length portions of the tension members 46 each will be supported at each tower 16 inward of the outermost tower 16 by clamps corresponding to the clamps 56.

The tension members 46 are disposed forward and rearward of the motors 25 in that the drop pipes or tubes 28 are alternately disposed forward and rearward of the delivery pipe 18. Thus, the drop pipes or tubes 18 extend vertically downwardly in alignment with the tension members 46 such that the lower end portions 34 are disposed closely alongside the tension members 46.

In order to attach each lower end portion 34 to the corresponding tension member 46, an elongated resilient strap 60 is provided having opposite ends 61 and 63. The strap 60 is disposed in longitudinal edge upstanding position and the lower margin or edge 65 of the strap 60, adjacent one end 61 thereof, includes a downwardly opening notch 62 and lower margin oppositely horizontally laterally outwardly projecting flanges 64 and 66 on opposite sides of the slot 62. In addition, the other end 63 of the strap includes a lower margin horizontally outwardly projecting flange 68 projecting laterally outwardly of the side of the strip 60 opposite to the side thereof outwardly of which the adjacent flange 66 projects.

With attention now invited more specifically to FIGS. 4, 5 and 6, each strip 60 is downwardly displaced relative to the corresponding tension member 46 such that the latter is upwardly received in the notch 62 and the strip 60 is then swung to a position generally paralleling the tension member 46 with the flanges 64 and 66 engaged under the tension member 46 from opposite sides thereof. The other end 63 of the strip 60 is then bowed over the side of the corresponding lower end portion 34 remote from the associated tension member 46 and engaged over the tension member 46 with the flange 68 passing beneath the tension member 46 from the side thereof opposite the side of the tension member 46 from under which the flange 66 is engaged. Thus, each drop lower end portion 34 is tightly held against the opposing side of the corresponding tension member 46.

When it is desired to raise the height of the tension members 46 due to the crop 38 reaching an elevation approaching the original height of the tension members 46, the strips 60 are removed, the tension on the tension members 46 is relieved and the clamps 56 are raised to the desired higher elevation. Then, the tension members 46 may be retensioned and strips 60 may again be applied to each drop lower end portion 34 and the associated tension member 46.

When the tension members 46 and strips 60 (comprising attaching means for attaching the lower end portions 34 to the tension members 46) are in place, the lower end portions 34 of the drop pipes or tubes 28 are securely held in position against deflection by wind. Thus, the lower end portions 34 are each retained in the corresponding furrow is 36 and a minimum amount of water is required to irrigate the crop 38.

In addition, the tension members 46 are disposed on opposite sides of the motors 25 utilized on the towers 16 and thus serve as barriers against the motors being "rubbed" by livestock. It is also pointed out that the clamps 56 may comprise insulator-type clamps, that the spools 44 may be constructed of dielectric material and that the tension members 46 may comprise noninsulated electrically conductive wire with an electric fence electrical pulse generator electrically connected to the tension members 46 closely adjacent the tower 12, assuming that the tension members 46 each extend from the outermost tower 16 to the brace 48.

The foregoing is considered as illustrative only of the principles of the invention. Further, since numerous modifications and changes readily will occur to those skilled in the art, it is not desired to limit the invention to the exact construction and operation shown and described and accordingly, all suitable modifications may be resorted to, falling within the scope of the invention.

What is claimed as new is as follows:

1. A self propelled irrigation device including an elongated delivery pipe supported at a plurality of points spaced along its length from ground supported mobile support towers, said pipe including a plurality of water outlet tubes opening outwardly of and depending downwardly from said pipe at points spaced therealong and including lower end portions terminating downwardly at least closely adjacent ground level, a low height, tensioned member extending between adjacent mobile support towers, and attaching structure removably anchoring said outlet tubes relative to said tension member against deflection by wind.

2. The irrigation device of claim 1 wherein at least said lower end portions are flexible and terminate downwardly at a level to engage, be deflected rearwardly by and trail along the ground from which said mobile support towers are supported.

3. The irrigation device of claim 1 including support means supporting said tension member from said support towers for vertical adjustment relative thereto.

4. The irrigation device of claim 1 wherein one end portion of said tension member is anchored relative to a winding spool journaled from one of said support towers and the other end portion of said tension member is releasably anchored to a distant support tower.

5. The irrigation device of claim 1 wherein said attaching means includes a horizontally elongated, resilient and side longitudinal edge upstanding strip having opposite ends, one end of said strip including a downwardly opening slot formed therein and a pair of oppositely horizontally outwardly directed lower edge flanges on opposite sides of said slot, the other end of said strip including a third lower edge flange directed horizontally outwardly of the side of said strip opposite to the side of said strip to which the adjacent flange of said pair of flanges is directed, said one end of said strip being downwardly engaged over said tension member with the latter received through said slot and said pair of flanges passing closely under said tension member from opposite sides thereof, the other end of said strip having said third flange passing closely under said tension member, the midportion of said strip, between said ends, passing about the side of the corresponding outlet tube remote from said tension member, the side of said outlet tube opposing said tension member being abutted there against.

6. The irrigation device of claim 5 wherein at least said lower end portions are flexible and terminate downwardly at a level to engage, be deflected rearwardly by and trail along the ground from which said mobile support towers are supported.

7. The irrigation device of claim 6 including support means supporting said tension member from said support towers for vertical adjustment relative thereto.

8. The irrigation device of claim 7 wherein one end portion of said tension member is anchored relative to a winding spool journaled from one of said support towers and the other end portion of said tension member is releasably anchored to a distant support tower.

9. A mobile irrigation device comprising an elongated delivery pipe supported in a generally horizontal position by one or more ground supported towers, said pipe including a plurality of water outlet tubes opening outwardly of and depending from said pipe at points spaced therealong and including lower end portions terminating near ground level, and a tension member extending between and removably anchoring said outlet tubes near said lower end portions against deflection by wind.

10. The irrigation device of claim 9, further comprising a support structure attached to at least one of said support towers to vertically adjustably secure said tension member.

11. The irrigation device of claim 9, wherein the tension member removably anchoring said outlet tubes includes a horizontally elongated, resilient, and side longitudinal edge upstanding strip having opposite ends, one end of said strip including an opening slot formed therein and a pair of oppositely horizontally outwardly directed edge flanges on the same longitudinal edge of said strip on opposite sides of said slot, the other end of said strip including a third edge flange directed horizontally outwardly of the side of said strip opposite to the side of said strip to which the adjacent flange of said pair of flanges is directed, said one end of said strip being detachably engaged over said tension member with the latter received through said slot and said pair of flanges passing closely about said tension member from opposite sides thereof, the other end of said strip having said third flange passing closely about said tension member, the midportion of said strip, between said ends, passing about the side of the corresponding outlet tube remote from said tension member, the side of said outlet tube opposing said tension member being abutted there against.

12. The irrigation device of claim 9, wherein said plurality of water outlet tubes are arranged in a series of pairs, each pair including a leading water outlet tube and a trailing water outlet tube, and each set of leading outlet tubes and trailing outlet tubes is each removably anchored by a separate tension member, each of said tension members substantially parallel to the other and vertically adjustably attached to a structure on at least one of said support towers.

13. The method of anchoring a row of water outlet tubes extending downwardly from a generally horizontally disposed delivery pipe on a mobile irrigation device from deflection by wind or transport, which comprises removably attaching a tension member to lower end portions of each of said outlet tubes and fixing said tension member to said irrigation device at spaced locations on opposite sides of said outlet tube row.

14. The method of claim 13 and further including the step of vertically adjusting said tension member at said spaced locations to adjust the height of said tension member on the lower end portions of said outlet tubes.

15. The method of claim 13 and further including the step of adjusting tension in said tension member.

* * * * *